United States Patent
Hong

(10) Patent No.: US 12,245,150 B2
(45) Date of Patent: Mar. 4, 2025

(54) METHOD FOR CONTROLLING SIDELINK COMMUNICATION, AND DEVICE THEREFOR

(71) Applicant: KT CORPORATION, Gyeonggi-do (KR)

(72) Inventor: Sung-Pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 343 days.

(21) Appl. No.: 17/763,395

(22) PCT Filed: Sep. 21, 2020

(86) PCT No.: PCT/KR2020/012714
§ 371 (c)(1),
(2) Date: Mar. 24, 2022

(87) PCT Pub. No.: WO2021/060786
PCT Pub. Date: Apr. 1, 2021

(65) Prior Publication Data
US 2022/0346011 A1  Oct. 27, 2022

(30) Foreign Application Priority Data

Sep. 27, 2019 (KR) .................. 10-2019-0119686
Sep. 16, 2020 (KR) .................. 10-2020-0119456

(51) Int. Cl.
*H04W 52/02* (2009.01)
*H04W 72/20* (2023.01)
*H04W 76/28* (2018.01)

(52) U.S. Cl.
CPC ....... *H04W 52/0229* (2013.01); *H04W 72/20* (2023.01); *H04W 76/28* (2018.02)

(58) Field of Classification Search
None
See application file for complete search history.

(56) References Cited

U.S. PATENT DOCUMENTS

2017/0325167 A1* 11/2017 Lu ................... H04W 52/0235
2019/0053305 A1   2/2019 Saiwai et al.
2019/0174411 A1   6/2019 Xu et al.
(Continued)

FOREIGN PATENT DOCUMENTS

KR  10-2019-0039101 A  4/2019
WO  2017/078783 A1     5/2017
WO  2018/084796 A1     5/2018

OTHER PUBLICATIONS

3GPP TSG-RAN WG2 Meeting #107 R2-1910967 Prague, Czech Republic, Aug. 26-30, 2019 Resubmission of R2-1907853 (Year: 2019).*

(Continued)

*Primary Examiner* — German Viana Di Prisco
(74) *Attorney, Agent, or Firm* — IP Legal Services, LLC

(57) ABSTRACT

Provided are a method and device for controlling sidelink communication. The method may include receiving sidelink discontinuous reception configuration information, configuring the sidelink discontinuous reception configuration information in the terminal, and discontinuously monitoring a physical sidelink control channel (PSCCH) on the basis of discontinuous reception (DRX) parameters included in the sidelink discontinuous reception configuration information.

14 Claims, 13 Drawing Sheets

(56) References Cited

U.S. PATENT DOCUMENTS

| | | |
|---|---|---|
| 2019/0373647 A1 | 12/2019 | Rugeland et al. |
| 2020/0296668 A1 | 9/2020 | Xu et al. |
| 2021/0051588 A1* | 2/2021 | Wu .................. H04W 52/0235 |
| 2021/0251037 A1* | 8/2021 | Akkarakaran ........ H04W 72/23 |
| 2022/0030661 A1* | 1/2022 | Jeong .................. H04W 76/28 |
| 2022/0191851 A1* | 6/2022 | Park ...................... H04L 1/1812 |
| 2022/0322486 A1* | 10/2022 | Park ...................... H04W 76/14 |

OTHER PUBLICATIONS

3GPP TSG-RAN WG2 Meeting #107 R2-1911125 Prague, Czech Republic, Aug. 26-30, 2019 Agenda Item: 11.4.2 Source: MediaTek Inc. (Year: 2019).*

3GPP TSG-RAN WG2 Meeting #113e R2-2100863 Online, Jan. 25-Feb. 5, 2020 Agenda Item: 8.15.2.2 Source: Apple Title: Discussion on HARQ related timers in SL DRX (Year: 2020).*

Huawei et al., "Further views on Rel-17 work area on NR sidelink enhancements for V2X and other use cases", RP-191831, 3GPP TSG RAN Meeting #85, Newport Beach, USA, Sep. 16-20, 2019.

* cited by examiner

FIG.11

*DRX information element*

```
DRX-Config ::=          SEQUENCE {
......
    drx-HARQ-RTT-TimerDL        INTEGER (0..56),
    drx-HARQ-RTT-TimerUL        INTEGER (0..56),
    drx-RetransmissionTimerDL   ENUMERATED {
                                    sl0, sl1, sl2, sl4, sl6, sl8, sl16, sl24, sl33, sl40, sl64, sl80,
                                    sl96, sl112, sl128, sl160, sl320, spare15, spare14, spare13,
                                    spare12, spare11, spare10, spare9, spare8, spare7, spare6,
                                    spare5, spare4, spare3, spare2, spare1},
    drx-RetransmissionTimerUL   ENUMERATED {
                                    sl0, sl1, sl2, sl4, sl6, sl8, sl16, sl24, sl33, sl40, sl64, sl80,
                                    sl96, sl112, sl128, sl160, sl320, spare15, spare14, spare13,
                                    spare12, spare11, spare10, spare9, spare8, spare7, spare6, spare5,
                                    spare4, spare3, spare2, spare1 },
......
```

METHOD FOR CONTROLLING SIDELINK COMMUNICATION, AND DEVICE THEREFOR

CROSS REFERENCE TO RELATED APPLICATIONS

This application is a National Stage Patent Application of PCT International Patent Application No. PCT/KR2020/012714 (filed on Sep. 21, 2020) under 35 U.S.C. § 371, which claims priority to Korean Patent Application Nos. 10-2019-0119686 (filed on Sep. 27, 2019) and 10-2020-0119456 (filed on Sep. 16, 2020), the teachings of which are incorporated herein in their entireties by reference.

TECHNICAL FIELD

The present disclosure relates to controlling sidelink communication.

BACKGROUND ART

There is demand for developing technology for processing a large amount of data at a high speed, for providing various services using wireless terminals in vehicles and industrial sites. Further, it is required to develop a communication system capable for processing large-volume data at high speed, to provide various services, such as a video service, a wireless service, and a machine-type communication service, as well as a simple voice service.

To this end, the international telecommunication union radio communication sector (ITU-R) introduces the requirements for adopting the international mobile telecommunications (IMT)-2020 standard, and many studies have been conducted for advancing next-generation wireless communication technology in order to satisfy the requirements of IMT-2020.

In particular, 3GPP has conducted research on the LTE-advanced Pro Rel-15/16 standards and the new radio access technology (NR) standard in parallel to meet the requirements for IMT-2020, called 5G technology, and 3GPP has a plan to approve the two standards as next-generation wireless communication technology.

5G technology may be applied and utilized in autonomous vehicles. For this, it is necessary to apply 5G technology to sidelink communication (e.g., vehicle communication (V2X)), and autonomous driving requires high speed data transmission and reception while guaranteeing high reliability.

Further, to meet driving scenarios of various autonomous vehicles, such as platooning, it is required to ensure various types of data communication, such as multicast data transmission/reception as well as multiple unicast data transmissions/receptions using sidelink communication.

UE performing sidelink communication should continuously monitor control data or user data in the sidelink radio resource to identify whether sidelink communication data is received. Such operation may cause significant power consumption.

DETAILED DESCRIPTION OF THE INVENTION

Technical Problem

The present disclosure introduces a method and device for preventing drastic increase in power consumption that may occur during sidelink communication.

Technical Solution

In an aspect, a method may be provided for performing sidelink communication by a UE. The method may include receiving sidelink discontinuous reception configuration information, configuring the UE with the sidelink discontinuous reception configuration information, and discontinuously monitoring a physical sidelink control channel (PSCCH) based on a discontinuous reception (DRX) parameter included in the sidelink discontinuous reception configuration information.

In another aspect, a method may be provided for controlling sidelink communication by a base station. The method may include generating sidelink discontinuous reception configuration information and transmitting the sidelink discontinuous reception configuration information to a UE, wherein the UE discontinuously monitors a physical sidelink control channel (PSCCH) based on a discontinuous reception (DRX) parameter included in the sidelink discontinuous reception configuration information.

In another aspect, a UE may be provided for performing sidelink communication. The UE may include a receiver receiving sidelink discontinuous reception configuration information and a controller configuring the UE with the sidelink discontinuous reception configuration information and discontinuously monitoring a physical sidelink control channel (PSCCH) based on a discontinuous reception (DRX) parameter included in the sidelink discontinuous reception configuration information.

In an aspect, a base station may be provided for controlling sidelink communication. The base station may include a controller generating sidelink discontinuous reception configuration information and a transmitter transmitting the sidelink discontinuous reception configuration information to a UE, wherein the UE discontinuously monitors a physical sidelink control channel (PSCCH) based on a discontinuous reception (DRX) parameter included in the sidelink discontinuous reception configuration information.

Advantageous Effects

The present embodiments may prevent a drastic increase in power consumption that may occur during sidelink communication.

BRIEF DESCRIPTION OF DRAWINGS

FIG. 11 is a view illustrating a DRX configuration (DRX-Config) information element according to an embodiment;

MODE FOR CARRYING OUT THE INVENTION

Figure 1:
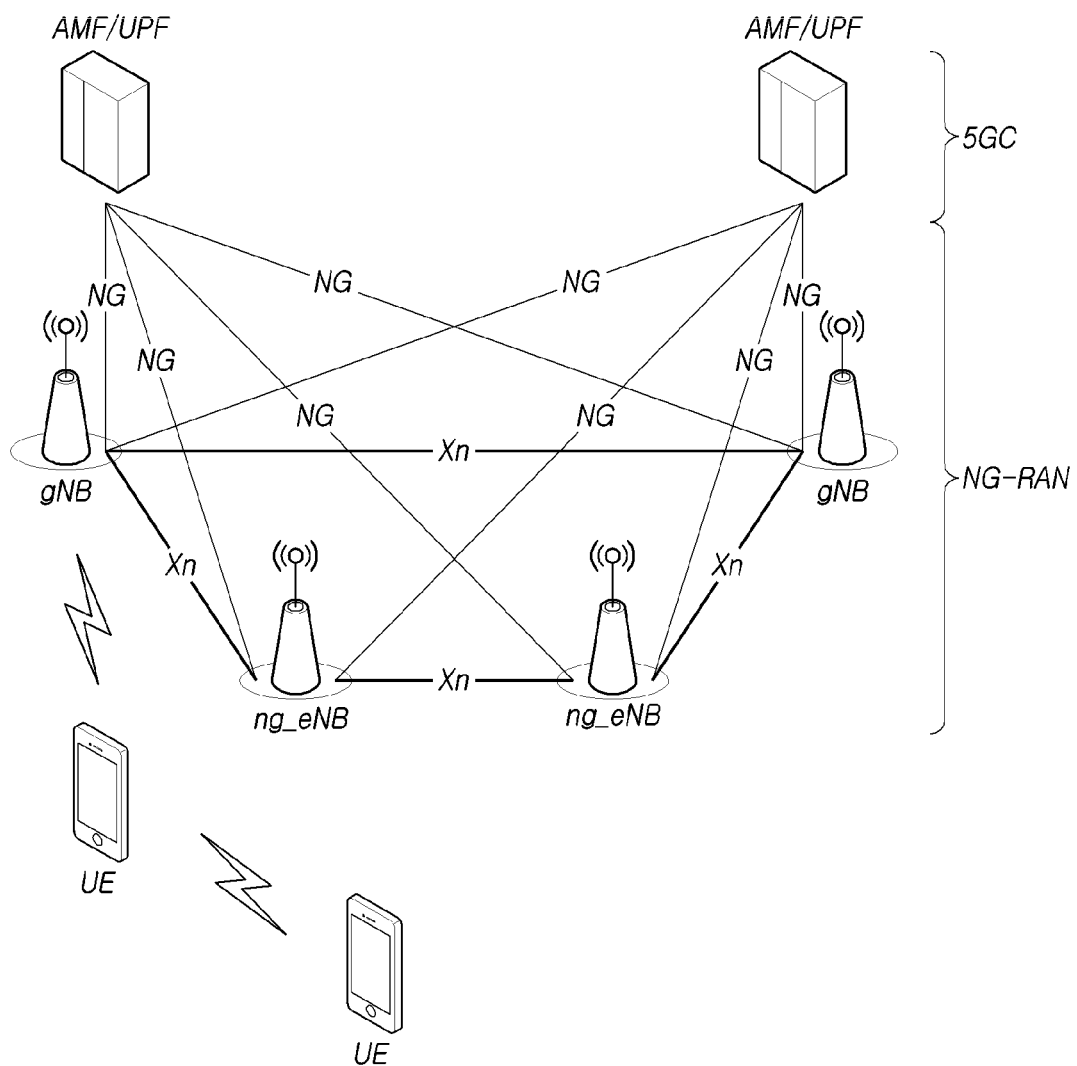
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, Wi-Fi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | normal | Yes | Yes |
| 1 | 30 | normal | Yes | Yes |
| 2 | 60 | Normal, Extended | Yes | No |
| 3 | 120 | normal | Yes | Yes |
| 4 | 240 | normal | No | Yes |

Figure 2:
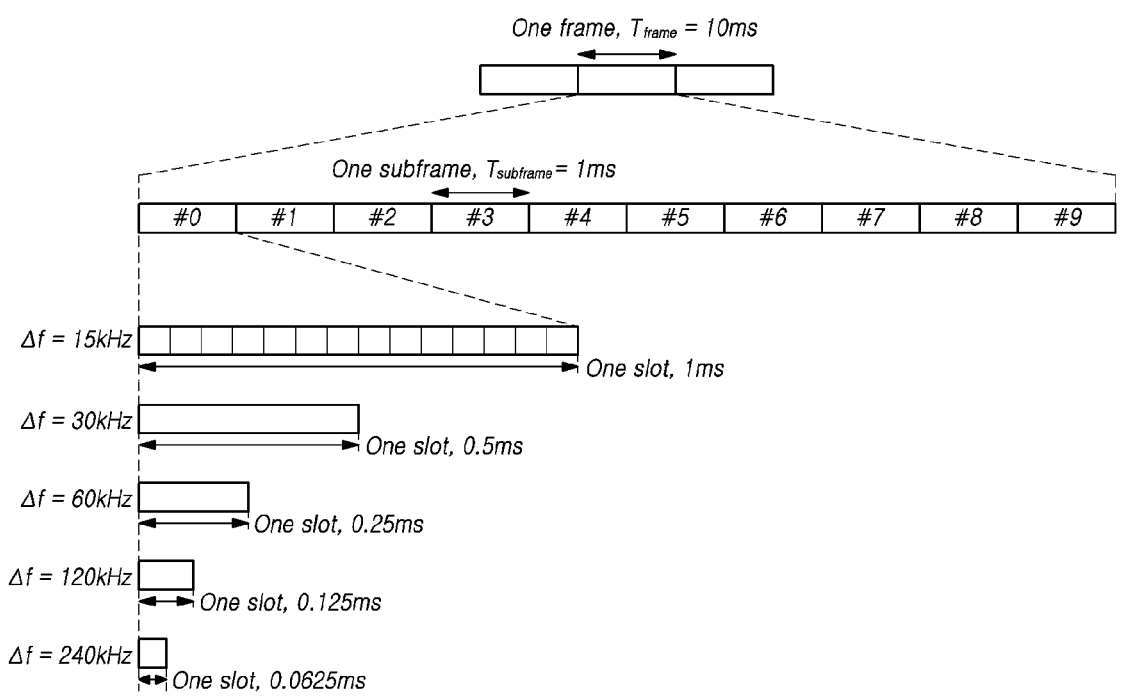
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
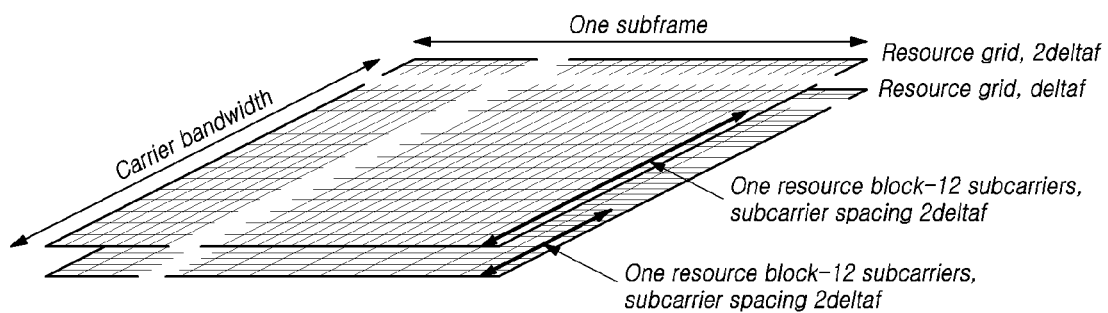
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
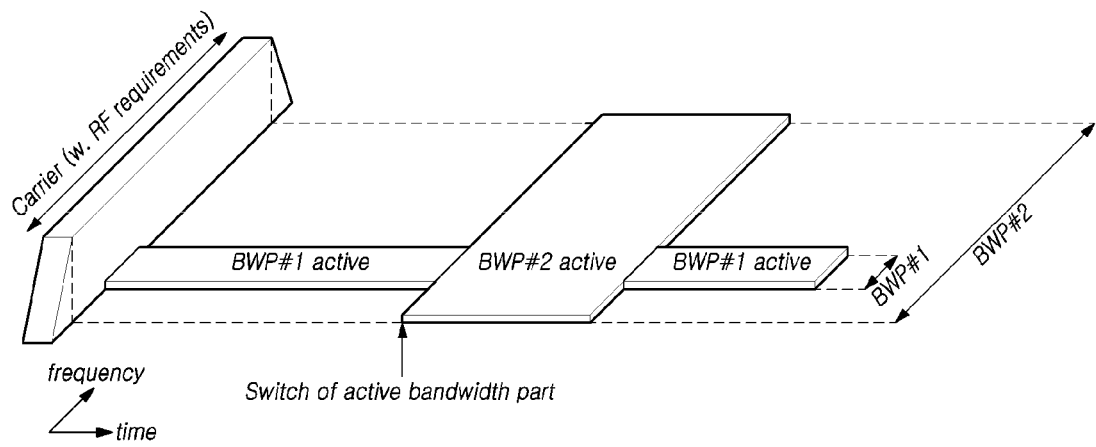
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
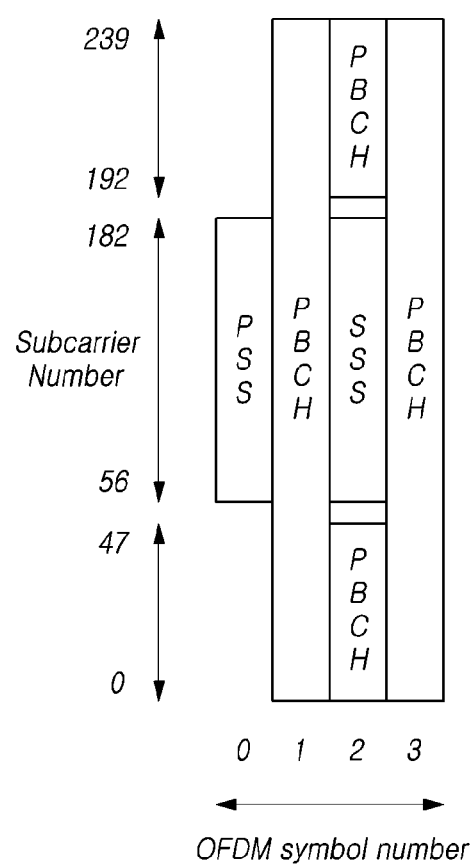
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
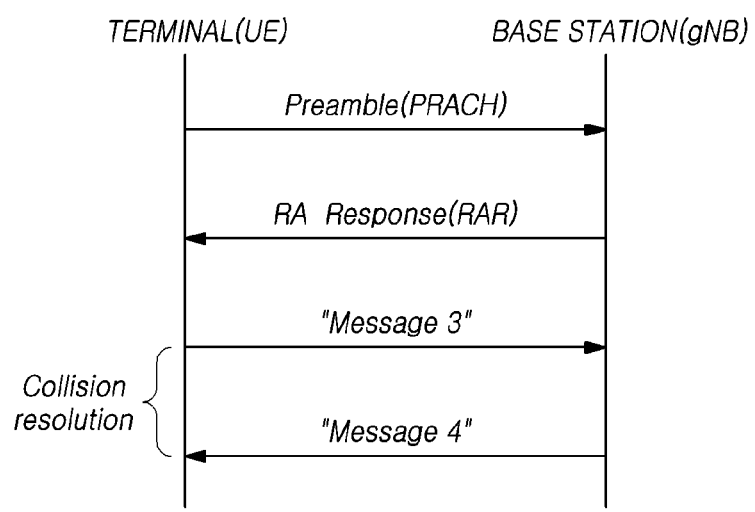
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
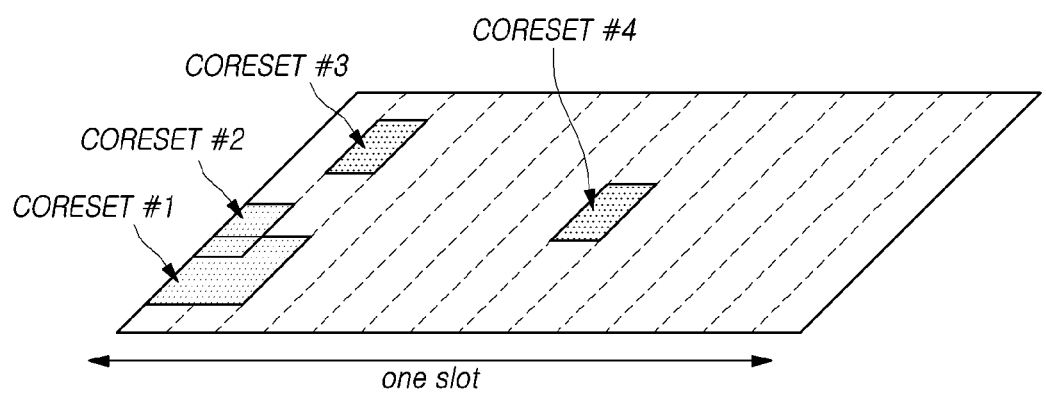
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

Lately, 3GPP introduced NR, and NR has been designed to meet various QoS requirements required for each of further divided and specified use scenarios as well as an enhanced data rate as compared to LTE. In particular, as representative usage scenarios of NR, enhancement mobile broadband (eMBB), massive MTC (mMTC), and ultra-reliable and low latency communications (URLLC) have been defined. For meeting the requirements for each usage scenario, it is required to design a flexible frame structure as compared with LTE. Each use scenario has different requirements for data rates, latency, reliability, coverage, etc. Therefore, as a method to efficiently satisfy the requirements for each usage scenario through the frequency band constituting a NR system, it has been designed to efficiently multiplex radio resource units which are based on different numerologies (e.g., subcarrier spacing, subframe, TTI, etc.).

For example, there is discussion on a method for multiplexing and supporting numerology having different subcarrier spacings based on time division multiplexing (TDM), frequency division multiplexing (FDM), or TDM/FDM through one or more NR component carriers. Also, discussion has been made for a scheme for supporting one or more time units in configuring a scheduling unit in the time domain. In this regard, NR defines subframe as one type of time domain structure. As reference numerology for defining the subframe duration, it has been determined to define a single subframe duration composed of 14 OFDM symbols of normal CP overhead based on 15 kHz sub-carrier spacing (SCS) which is the same as that of LTE. Accordingly, in NR, the subframe has 1 ms time duration. However, unlike LTE, the subframe of NR is absolute reference time duration and, as a time unit which serves as a basis of actual uplink/downlink data scheduling, a slot and a mini-slot may be defined. In this case, the number (y value) of OFDM symbols constituting a corresponding slot is determined to be y=14 regardless of the SCS value in the case of normal CP.

Therefore, a slot is made up of 14 symbols. Further, depending on the transmission direction of the corresponding slot, all the symbols may be used for DL transmission, or all the symbols may be used for UL transmission, or the symbols may be used in the form of DL portion+(gap)+UL portion.

Further, in a numerology (or SCS), a mini-slot is defined. The mini-slot is made up of a smaller number of symbols than the typical slot. For minislot-based uplink/downlink data transmission/reception, a short-length time-domain scheduling interval may be set, or a long-length time-domain scheduling interval for uplink/downlink data transmission/reception may be configured via slot aggregation. In particular, in the case where latency-sensitive data, such as URLLC, is transmitted or received, if scheduling is performed in slot units which are based on 1 ms (14 symbols) as defined in the numerology-based frame structure which has a small SCS value, e.g., 15 kHz, the latency requirements may be hard to meet. Thus, a mini-slot constituted of a smaller number of OFDM symbols than the typical slot constituted of 14 symbols may be defined. Based the mini-slot, scheduling may be performed while satisfying the URLLC requirements.

<LTE V2X Communication>

In the typical LTE system, for direct communication between UEs and providing a vehicle to everything (V2X) service, particularly V2V service, a radio channel and radio protocol have been designed for inter-UE direct communication (i.e., sidelink).

In relation to the sidelink, PSSS/SSSS and PSBCH (Physical Sidelink Broadcasting channel are defined. PSSS/SSS is a synchronization signal for synchronization between a wireless sidelink transmitting end and a receiving end, and PSBCH is a channel for transmitting and receiving a sidelink master information block (MIB) related thereto. Also, physical sidelink discovery channel (PSDCH), physical sidelink control channel (PSCCH) for sidelink control information (SCI) transmission/reception, and physical sidelink shared channel (PSSCH) have been designed.

Further, to allocate a radio resource for sidelink, mode 1 and mode 2 have been developed separately. In the mode 1, the base station allocates a radio resource, In the mode 2, the UE selects and allocates one from a radio resource pool. Further, the LTE system required an additional technical evolution to meet the V2X scenario.

By giving the vehicle access to a mobile communication network (e.g., LTE/LTE-A), the vehicle may be connected to the Internet and to other vehicles. V2X (Vehicle to Everything) communication includes the following four types.

V2V (Vehicle to Vehicle) Communication: Communication between vehicles

V2I (Vehicle to Infrastructure) Communication: Communication between vehicle and infrastructure V2N (Vehicle to Network) Communication: Communication between vehicle and network V2P (Vehicle to Pedestrian) Communication: Communication between vehicle and pedestrian FIG. 8 is a view illustrating an exemplary architecture of a V2X communication system in an LTE system.

Figure 8:
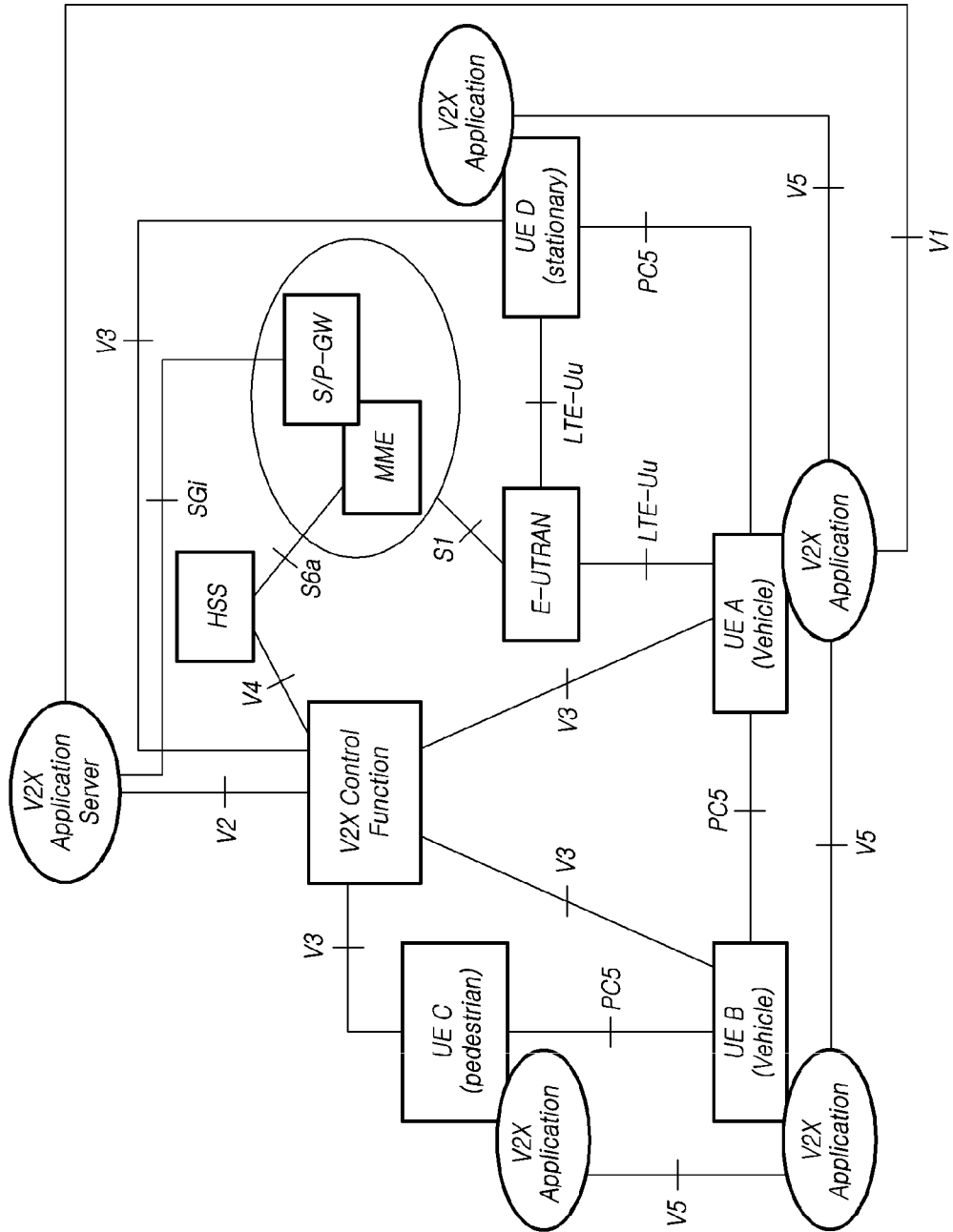
FIG. 8 is a view illustrating an example architecture of a V2X communication system in an LTE system.

Referring to FIG. 8, a V2X service may be provided through a PC5 interface and/or Uu interface. Support via the PC5 interface was provided via V2X sidelink communication.

Specifically, various V2X communication UEs (UEs A to D) are linked through the PC5 interface, and the V2X communication UE and the V2X control function are linked through the V3 interface. Further, the V2X application server and the V2X application of each V2X communication UE are linked through the V1 interface. The V2X communication UE is linked with the base station (E-UTRAN) through the Uu interface, and the base station is linked with the core network (MME and S/P GW) through the S1 interface. The MME and S/P GW are linked with the HSS through the S6a interface, and the HSS is linked with the V2X control function through the V4 interface. The core network entity is linked with the V2X application server through the SGi interface. Meanwhile, the respective V2X applications of the V2X communication UEs are linked to each other through the V5 interface.

In the typical LTE system, resource allocation by the UE supporting V2X sidelink communication supported the following two modes.

Scheduled resource allocation: it requires RRC connection for data transmission. The UE requests transmission resource allocation from the base station, and the base station allocates a transmission resource for transmission of sidelink control information and data. The UE transmits a scheduling request and following sidelink BSR to the base station. The base station schedules a transmission resource for sidelink communication using a configured SL-RNTI. For convenience of description, the resource allocation mode that enables the base station to allocate a sidelink resource is referred to as a first mode. This is merely for convenience of description and may be replaced with other names (sidelink Mode 1 for D2D, sidelink Mode 3 for V2X).

UE autonomous resource allocation: the UE itself selects a resource from a pre-configured sidelink resource pool and selects a transmission format for transmission of sidelink control information and data. If a resource pool is selected, the selection is effective during the overall sidelink control period. If the period ends, the UE may reselect a resource pool. For convenience of description, the resource allocation mode that enables the UE to select a sidelink resource according to a predetermined criterion from the sidelink resource pool is referred to as a second mode (sidelink Mode 2 for D2D, sidelink Mode 4 for V2X). This is for ease of description, and it may be replaced with another term.

Further, the above-described first mode and second mode couldn't simultaneously be applied in the same time period. In other words, any typical UE could be operated according to only one the first mode of the second mode in any time.

In D2D communication such as public safety, both the modes (mode 1 and mode 2) share the same resource allocation structure. Data transmission is scheduled in a PSCCH period. A set of subframes in this period is used for PSCCH transmission. Another set of subframes is used for PSSCH transmission. The PSCCH including scheduling control information for one corresponding PSSCH is transmitted always before PSSCH data.

V2X communication uses a resource allocation structure totally different from the two modes of D2D communication to allocate PSCCH and PSSCH in two modes (mode 3 and mode 4). First, there is no PSCCH period to allow two physical channels (PSCCH and PSSCH) to be distributed and transmitted in different periods. The PSCCH and the PSSCH are separated in the frequency domain. In a SCI format 1, PSSCH transport blocks corresponding to two identical SCIs may be transmitted in the same subframe. The transport block may be transmitted once or twice. When transmitted twice, the receiver provides combining for the redundancy version of the PSSCH transport block.

For sidelink communication when the UE is out of coverage of the base station/cell, one set of transmission and reception resource pools for sidelink control information may be preconfigured in the UE. Further, one set of transmission and reception resource pools for sidelink data information may be preconfigured in the UE. Even when some UEs are in coverage, and some UEs are out of coverage, they should be able to perform sidelink communication. To that end, all the UEs should be configured with a resource pool for reception sidelink control information with a union of all used resource pools to transmit sidelink control information from the serving cell, neighbor cell, and out-of-coverage (i.e., pre-configured transmission resource pools). Accordingly, the UE's power consumption increases to receive sidelink control information.

NR V2X

3GPP has approved the NR V2X study items to support advanced V2X services, such as vehicles platooning, extended sensors, advanced driving, and remote driving based on NR. NR V2X is not intended to replace the service provided by LTE V2X and assumes to supplement LTE V2X for enhanced V2X service and support interworking with LTE V2X. Further, the corresponding item supports sidelink unicast, sidelink groupcast, and sidelink broadcast transmission types.

The NR V2X resource allocation scheme may support i) the first mode in which the base station performs scheduling for communication resources between UEs and ii) the second mode in which the UE autonomously selects resources from the resource pool. Further, the second mode may be divided into one or more of the sub-divided types as follows.

Mode 2-a: UE autonomously selects sidelink resource for transmission.

Mode 2-b: UE assists sidelink resource selection for other UE(s).

Mode 2-c: UE is configured with NR configured grant (type-1 like) for sidelink transmission.

Mode 2-d: UE schedules sidelink transmissions of other UEs

As such, NR V2X is also expected to basically follow the typical LTE V2X resource allocation scheme. Further, a similar type of transmission and reception scheme is expected to be applied. Therefore, the reception UE has a burden of continuously monitoring the sidelink reception resource pool in all resource pools for sidelink communication.

In order to overcome such defects, the disclosure introduces a method and device for power-efficiently transmitting and receiving data by a sidelink communication UE.

In the following description, the above-described vehicle communication, V2X communication, and D2D communication are collectively referred to as sidelink communication, but this is merely for convenience of description, it should be understood as encompassing all operations for transmission and reception of data between UEs. Further, the above-described first mode and second mode are merely for a better understanding, and any different resource allocation schemes may correspond to the first and second modes, with the disclosure applicable thereto. Further, there may be any two or more resource allocation schemes. Although two resource allocation schemes are described herein as an example, the same may also be applied where three or more modes are present.

Meanwhile, the present embodiments may be applied to sidelink communication between an NR UE and an NR UE through an NR base station. Or, the present embodiments may be applied to sidelink communication between an NR UE and an LTE UE through an NR base station. Or, the present embodiments may be applied to sidelink communication between an LTE UE and an LTE UE through an NR base station. Or, the present embodiments may be applied to sidelink communication between an LTE UE and an LTE UE through an LTE base station. Or, the present embodiments may be applied to sidelink communication between an LTE UE and an NR UE through an LTE base station. Or, the present embodiments may be applied to sidelink communication between an NR UE and an NR UE through an LTE base station. Or, the present embodiments may be applied to LTE UEs connected to an eLTE base station connected through a 5G system (or 5G core network). Or, the present embodiments may be applied to E-UTRAN NR dual connectivity (EN-DC) UEs or NR E-UTRAN dual connectivity (NE-DC) UEs simultaneously providing LTE and NR wireless connections.

The following description is based on unicast-type sidelink communication for convenience of description. This is merely for convenience of description, and embodiments of the disclosure are likewise applicable to groupcast or broadcast schemes. For example, DRX parameters for unicast and DRX parameters for groupcast or broadcast may be separately practiced, which also belongs to the category of the present embodiments. Further, the disclosure may also be applied to any sidelink-based application (e.g., public safety, IoT, or commercial D2D) communication as well as sidelink-based V2X communication.

Figure 9:
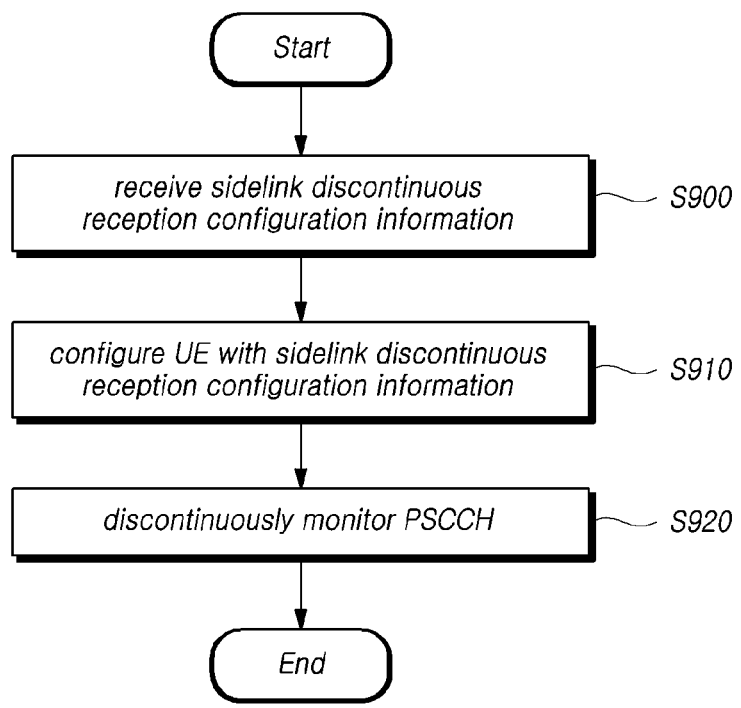
FIG. 9 is a flowchart for describing operations of a UE according to an embodiment.

FIG. 9 is a flowchart for describing a method of a UE for performing sidelink communication according to an embodiment.

Referring to FIG. 9, a method for performing sidelink communication by a UE may include receiving sidelink discontinuous reception configuration information (S900).

For example, sidelink discontinuous reception configuration information may include information necessary for the UE performing sidelink communication to apply the DRX operation to PSCCH reception. To that end, the sidelink discontinuous reception configuration information may be received in various manners. The UE, receiving the sidelink discontinuous reception configuration information, may be a UE which is in the state of any one of RRC connected, RRC idle, and RRC inactive.

According to an embodiment, the sidelink discontinuous reception configuration information may be included in the system information transmitted from the base station. For example, the system information may be included in a sidelink-specific system information block (SIB) or a conventional SIB transmitted from the base station. The system information may include sidelink radio bearer (SLRB) information.

According to another embodiment, the sidelink discontinuous reception configuration information may be included in an RRC message transmitted from the transmission UE transmitting the PSCCH or the base station. For example, the base station may transmit discontinuous reception configuration information to each UE through the RRC message. Or, the transmission UE, transmitting sidelink communication data, may transmit the discontinuous reception configuration information to the reception UE.

The method for performing sidelink communication by the UE may include configuring the UE with the sidelink discontinuous reception configuration information (S910).

For example, the UE, receiving the sidelink discontinuous reception configuration information, may be configured with the DRX parameters included in the sidelink discontinuous reception configuration information. The DRX parameters may be configured separately with respect to at least one of sidelink carrier, sidelink resource pool, UE, MAC entity, UE group, and session. For example, DRX parameters may be configured per sidelink carrier, per sidelink resource pool, per UE, per MAC entity, per UE group, or per session.

According to an embodiment, the DRX parameters may include at least one information of a sidelink discontinuous reception HARQ RTT timer, a sidelink discontinuous reception retransmission timer, a sidelink discontinuous reception on-duration timer, and a sidelink discontinuous reception inactivity timer. Each information included in the DRX parameter may be configured with a different value from that of the DRX parameter configured for the UE to perform communication with the base station.

The method for performing sidelink communication by the UE may include discontinuously monitoring the physical sidelink control channel (PSCCH) based on the discontinuous reception (DRX) parameter included in the sidelink discontinuous reception configuration information (S920).

For example, the UE discontinuously monitors the PSCCH based on the DRX parameter, determining whether there is sidelink communication data for the UE. Further, the transmission UE transmits a PSCCH in the time period during which the reception UE monitors based on the DRX parameter.

Or, the UE determines a PSCCH discontinuous monitoring operation based on whether sidelink HARQ is activated. For example, the UE may apply the DRX parameter separately for where the HARQ for sidelink data is activated or where the HARQ is deactivated, determining whether to monitor the PSCCH. Whether the HARQ is activated may be controlled by sidelink control information or by any method.

According to the embodiment, UE may be able to reduce power consumption for the sidelink communication. Described below are operations of a peered base station with reference to the drawings.

Figure 10:
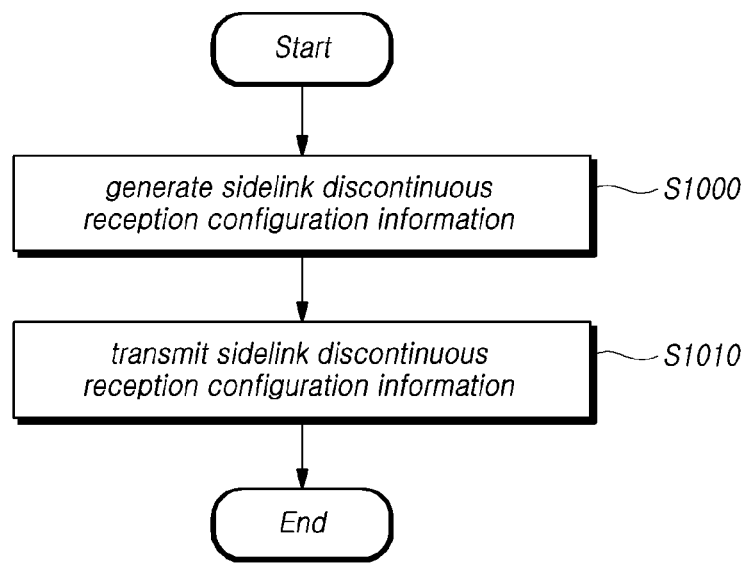
FIG. 10 is a flowchart for describing operations of a base station according to an embodiment.

FIG. 10 is a flowchart for a method of a base station for controlling sidelink communication according to an embodiment.

Referring to FIG. 10, a method for controlling sidelink communication by a base station may include generating sidelink discontinuous reception configuration information (S1000).

For example, sidelink discontinuous reception configuration information may include information necessary for the UE performing sidelink communication to apply the DRX operation to PSCCH reception.

For example, the sidelink discontinuous reception configuration information may include DRX parameters. The DRX parameters may be configured separately with respect to at least one of sidelink carrier, sidelink resource pool, UE, MAC entity, UE group, and session. For example, DRX parameters may be configured per sidelink carrier, per sidelink resource pool, per UE, per MAC entity, per UE group, or per session.

According to an embodiment, the DRX parameters may include at least one information of a sidelink discontinuous reception HARQ RTT timer, a sidelink discontinuous reception retransmission timer, a sidelink discontinuous reception on-duration timer, and a sidelink discontinuous reception inactivity timer. Each information included in the DRX parameter may be configured with a different value from that of the DRX parameter configured for the UE to perform communication with the base station.

The method for controlling sidelink communication by the base station may include transmitting the sidelink discontinuous reception configuration information to the UE (S1010).

The sidelink discontinuous reception configuration information may be transmitted in various manners. The UE, receiving the sidelink discontinuous reception configuration information, may be a UE which is in the state of any one of RRC connected, RRC idle, and RRC inactive.

According to an embodiment, the sidelink discontinuous reception configuration information may be included in the system information. For example, the system information may be included in a sidelink-specific system information block (SIB) or a conventional SIB transmitted from the base station. The system information may include sidelink radio bearer (SLRB) information.

According to another embodiment, the sidelink discontinuous reception configuration information may also be included in an RRC message. For example, the base station may transmit discontinuous reception configuration information to each UE through the RRC message.

According to another embodiment, the transmission UE, transmitting sidelink communication data, may transmit the discontinuous reception configuration information to the reception UE.

Meanwhile, the UE discontinuously monitors the physical sidelink control channel (PSCCH) based on the discontinuous reception (DRX) parameter included in the sidelink discontinuous reception configuration information. For example, the UE, receiving the sidelink discontinuous reception configuration information, may be configured with the DRX parameters included in the sidelink discontinuous reception configuration information.

The UE discontinuously monitors the PSCCH based on the DRX parameter, determining whether there is sidelink communication data for the corresponding UE. Further, the transmission UE transmits a PSCCH in the time period during which the reception UE monitors based on the DRX parameter.

Or, the UE determines a PSCCH discontinuous monitoring operation based on whether sidelink HARQ is activated. For example, the UE may apply the DRX parameter separately for where the HARQ for sidelink data is activated or where the HARQ is deactivated, determining whether to monitor the PSCCH. Whether the HARQ is activated may be controlled by sidelink control information or by any method.

More detailed embodiments for the above-described operations of the base station and the UE are described below in various manners. The embodiments described below may be combined in various manners and be performed by the base station or the UE. Further, to perform each embodiment below, any step may be added to the above-described operations of the base station or any step thereof may be omitted or modified.

The embodiments described below may be practiced individually or in combination.

Configuration of Parameter for Discontinuous Reception (DRX) on Sidelink Per Sidelink Carrier/Per Resource Pool/Per UE/Per MAC Entity/Per Group/Per Session As described above, in the typical sidelink technology, the UE was supposed to continuously monitor all resource pools where sidelink control information (SCI) could be transmitted. In the embodiment, the sidelink UE may be allowed to support discontinuous reception to save power consumption used for continuous monitoring.

For example, the UE (or reception UE) may be configured (or pre-configured) with parameters for discontinuous reception for at least one of a specific cell/carrier/frequency, specific resource pool, specific UE, specific MAC entity (e.g. MCG MAC, SCG MAC) and a specific group/groupcast session (e.g. L1 source ID, L1 destination ID, L2 source ID, L2 destination ID, any combination thereof (e.g. L1 source ID and L1 destination ID)) and a specific broadcast session (e.g. L1 source ID, L1 destination ID, L2 source ID, L2 destination ID, or any combination thereof (e.g. L1 source ID and L1 destination ID)).

According to an embodiment, the reception UE may perform discontinuous reception operation on at least one of the corresponding cell/carrier/frequency, the corresponding resource pool, the corresponding UE, the corresponding MAC entity, the corresponding group/groupcast session and the corresponding broadcast session, according to the configured discontinuous reception parameter. According to another embodiment, the reception UE may perform discontinuous reception operation on at least one of any cell/carrier/frequency, any resource pool, any UE, any MAC entity, any group/groupcast session and any broadcast session, according to the configured discontinuous reception parameter.

According to still another embodiment, the UE (or reception UE) may be configured (or preconfigured) with a parameter for discontinuous reception commonly applied to at least one of any cell/carrier/frequency, any resource pool, any UE, any MAC entity, any group/groupcast session and any broadcast session. The reception UE may perform discontinuous reception operation according to the configured discontinuous reception parameter.

One or more of the following embodiments may be applied to the above-described sidelink discontinuous reception parameter.

Embodiment Indicating Discontinuous Reception Parameter Through Sidelink-Specific SIB for RRC IDLE/RRC Inactive UE For example, for the RRC idle/RRC inactive UE or to indicate a specific default operation of the RRC connected UE, the base station may indicate the discontinuous reception parameter (DRX parameter). The base station may provide discontinuous reception configuration information (DRX configuration information, hereinafter referred to below as SL-DRX-Config for convenience of description) for sidelink communication. The base station may control the UE's PSCCH monitoring operation through sidelink-specific system information (or cell-specific SIB or any SIB).

For example, when the RRC idle/RRC inactive UE monitors the PSCCH through the sidelink communication reception resource pool (or when the RRC idle/RRC inactive UE monitors the PSCCH pool or when the RRC idle/RRC inactive UE monitors the PSCCH resource), the discontinuous reception parameter may be configured based on the SIB configuration. The base station may provide a sidelink radio bearer (SLRB). The base station may instruct the UE to map the PC5 QoS profile to the SLRB through a sidelink-specific SIB (or cell-specific SIB or any SIB). When the RRC idle/RRC inactive UE initiates transmission of a new PC5 QoS flow, an SLRB associated with the PC5 QoS profile may be configured based on the SIB configuration.

Embodiment in which Transmission UE (Tx UE) Indicates Discontinuous Reception Parameter to Reception UE (Rx UE) Through RRC Signaling According to an embodiment, a specific UE may discover another UE through a sidelink, and an inter-UE direct link may be set up through the higher layer protocol (e.g., PC5 signaling protocol) of TS23.303. In this state, if a packet to be transmitted through sidelink is generated, the higher layer of the transmission UE maps the packet to be transmitted to the PC5 QoS flow as per the PC5 QoS rule. The transmission UE transfers the packet to be transmitted, along with the associated QoS flow identifier (e.g., PC5 QFI), to the access stratum (AS). The transmission UE may request an SLRB configuration from the base station. The SLRB request, which is transmitted through the uplink RRC message, includes the PC5 QoS flow identifier.

According to an embodiment, the transmission UE may request the SLRB configuration from the base station, through the sidelink UE information message transmitted for the UE interested in sidelink transmission to request a sidelink resource. According to another embodiment, the transmission UE may send a request for SLRB configuration to the base station through any uplink RRC message. The base station indicates (e.g., instructs) the SLRB configuration to the transmission UE. The corresponding SLRB configuration information may include one or more information of the SLRB mapping to the QoS flow, PDCP/RLC/LCH configurations and the sidelink cell/carrier configuration through which the corresponding SLRB data is to be transmitted/received. Meanwhile, the transmission UE may configure an SLRB. The transmission UE may transmit an RRC message including the SLRB configuration to the reception UE. The reception UE may configure an SLRB. The reception UE may transmit an acknowledge message to the transmission UE. The transmission/reception UE may transmit/receive data through the sidelink.

According to another embodiment, the transmission UE may request an SLRB configuration from the base station. The base station indicates the SLRB configuration to the transmission UE. The base station indicates the SLRB configuration directly to the reception UE peered to the transmission UE (having a direct link through the sidelink). The corresponding SLRB configuration information may include one or more information of the SLRB mapping to the QoS flow, PDCP/RLC/LCH configurations and the sidelink cell/carrier configuration through which the corresponding SLRB data is to be transmitted/received. The transmission UE may configure an SLRB. The reception UE may configure an SLRB. The transmission UE may transmit an acknowledge message to the base station. The reception UE may transmit an acknowledge message to the base station. The transmission/reception UE may transmit/receive data through the sidelink.

According to another embodiment, the transmission UE in the RRC idle/RRC inactive state may transmit an RRC message including the SLRB configuration to the reception UE. The reception UE may configure an SLRB. The reception UE may transmit an acknowledge message to the transmission UE. The transmission/reception UE may transmit/receive data through the sidelink. Information for the SLRB configuration in the RRC idle/RRC inactive state may be received through system information. The base station may provide a sidelink radio bearer (SLRB). Through this, the base station may instruct to map the PC5 QoS profile to the SLRB through a sidelink-specific SIB (or cell-specific SIB or any SIB). When the RRC idle/RRC inactive UE initiates transmission of a new PC5 QoS flow, an SLRB associated with the PC5 QoS profile may be configured based on the SIB configuration.

When the transmission UE requests the SLRB configuration from the base station, when the UE interested in sidelink transmission transmits a sidelink UE information message for requesting a sidelink resource to the base station, when the base station indicates the SLRB configuration to the transmission UE, when the transmission UE transmits the SLRB configuration to the reception UE, or when the base station indicates the SLRB configuration to the reception UE, the corresponding RRC message may include parameter information for discontinuous reception. The corresponding RRC message may include one or more PSCCH resource configuration information. The corresponding RRC message may include the discontinuous parameter value preferred/requested/expected by the UE. The corresponding RRC message may include a UE identifier for discontinuous reception.

Embodiment of Indicating UE Identifier (e.g., L1 Destination ID, L1 Source ID, etc.) for Discontinuous Reception The discontinuous reception function may be configured through the above-described RRC signaling or may be preconfigured in the MAC entity.

The UE may be configured with one or more PSCCH resource configurations by RRC signaling. Or, the UE may be pre-configured with one or more PSCCH resource configurations. The PSCCH resource configuration may be for PSCCH reception or for PSCCH transmission. The PSCCH resource configuration may be associated per sidelink transmission mode. The UE may be configured to detect the corresponding SCI format on the PSCCH by the higher layer for each PSCCH resource configuration associated to each sidelink transmission mode. In this case, the UE may attempt PSCCH decoding using one or more information of PSCCH resource configuration, L1 source ID and L1 destination ID.

According to an embodiment, the UE may control, through the discontinuous reception function, the PSCCH monitoring operation on any sidelink RNTI in the MAC entity (e.g., SL-RNTI, SL-V-RNTI, SL-SPS-RNTI, or a unicast-based sidelink RNTI allocated by the scheduling UE, transmission UE, or base station) or L1 destination ID or L1 source ID or L1 source ID and L1 destination ID or L1 groupcast ID or L1 broadcast ID. The any sidelink RNTI, L1 destination ID, L1 source ID, L1 source ID, and L1 destination ID, L1 groupcast ID, L1 broadcast ID may be preconfigured or may be indicated to the UE by RRC signaling. Thus, the corresponding UE may perform/trigger the discontinuous reception operation on the PSCCH associated with the UE identifier.

Parameter Embodiment for Sidelink Discontinuous Reception

When the UE is in the RRC connected state, the UE's MAC entity may discontinuously receive the PSCCH for all sidelink carriers (or for all activated sidelink carriers or for all configured sidelink carriers). Or, although the UE is in the RRC idle/RRC inactive state, if the discontinuous reception function is preconfigured in the UE or if the DRX is (pre)configured in the UE when the corresponding system information or specific data is received by the base station or any trigger condition, e.g., a change in any state inside the UE, occurs, the UE's MAC entity may discontinuously receive the PSCCH for all sidelink carriers (or for all activated sidelink carriers or for all configured sidelink carriers). Otherwise, the UE may continuously monitor the PSCCH.

For example, the sidelink discontinuous reception parameter may include one or more of the following parameters.

Sidelink discontinuous reception HARQ RTT timer (referred to as drx-HARQ-RTT-TimerSL for convenience of description): Minimum duration information before SCI (or SL grant) for HARQ retransmission is expected by the MAC entity. The corresponding timer may be operated for each SL HARQ process. This may be a parameter from the viewpoint of the reception UE.

Sidelink discontinuous reception retransmission timer (referred to as drx-RetransmissionTimerSL for convenience of description): Maximum duration information until sidelink retransmission is received. The corresponding timer may be operated for each SL HARQ process. This may be a parameter from the viewpoint of the reception UE.

Sidelink discontinuous reception on-duration timer: Duration information at the start of the DRX cycle in the sidelink Sidelink discontinuous reception inactivity timer: Duration information after PSCCH occasion (or PSCCH period or PSCCH reception time) where the PSCCH indicates new sidelink transmission for the MAC entity If the UE receives discontinuous reception considering both transmission and reception through the sidelink, the DRX parameter may include the following parameters.

Sidelink reception discontinuous reception HARQ RTT timer (referred to as drx-HARQ-RTT-TimerRX-SL for convenience of description): Minimum duration information until before reception SCI (or SL grant) for HARQ retransmission is expected by the MAC entity. The corresponding timer may be operated for each SL reception HARQ process.

Sidelink reception discontinuous transmission HARQ RTT timer (referred to as drx-HARQ-RTT-TimerTX-SL for convenience of description): Minimum duration information until before grant [or SCI (e.g., when scheduled by the UE) or DCI (e.g., when scheduling is allocated by the base station)] for transmission HARQ retransmission is expected by the MAC entity. The corresponding timer may be operated for each SL transmission HARQ process.

Sidelink reception discontinuous reception retransmission timer (referred to as drx-RetransmissionTimerRX-SL for convenience of description): Maximum duration information until sidelink retransmission is received. The corresponding timer may be operated for each SL reception HARQ process.

Sidelink transmission discontinuous retransmission timer (referred to as drx-RetransmissionTimerTX-SL for convenience of description): Maximum duration information until grant [or SCI (e.g., when scheduled by the UE) or DCI (e.g., when scheduling is allocated by the base station)] for sidelink retransmission is received. The corresponding timer may be operated for each SL transmission HARQ process.
Embodiment of Indicating DRX Parameter Set Through SIB It is possible to define discontinuous reception configuration having a plurality of different parameter values according to various requirements. For example, a plurality of discontinuous reception configuration sets may be defined to have different parameter values per carrier/resource pool/UE/MAC entity/group/session. For example, a first pre-configuration set may have small on-duration timer and inactivity timer values to reduce power consumption, and a second pre-configuration set may have medium on-duration timer and inactivity timer values. A third pre-configuration set may have large duration timer and inactivity timer values. The corresponding configuration set may be identified with the index/ID. The UE may pre-configure all of the plurality of discontinuous reception configuration sets having different parameter values.

When the UE pre-configures a plurality of discontinuous reception configuration sets, the base station may instruct to use the discontinuous reception configuration set having a specific parameter value through system information. The UE may apply the corresponding configuration set through the index/ID that identifies the corresponding configuration set. The UE may transmit the index/ID information preferred/requested/expected by the UE to the base station through the UE assistance information (or any uplink RRC message) on the Uu interface. The UE (e.g., the reception UE) may transmit the index/ID information preferred/requested/expected by the UE to another UE (e.g., the transmission UE) through the UE assistance information (or any sidelink RRC message) on the sidelink interface.
Embodiment when Sidelink DRX HARQ RTT Timer is Configured to have a Larger Value than the DRX HARQ RTT Timer on the Uu Interface For example, when using a sidelink transmission mode (e.g., mode 1) scheduled by the base station, if the transmission UE receives a HARQ feedback (NACK) from the reception UE for HARQ retransmission, the transmission UE indicates, to the base station, that retransmission is needed. For example, the transmission UE may indicate (e.g., inform), to the base station, that retransmission is necessary through at least one of a sidelink HARQ ACK/NACK report via PUCCH or PUSCH, PUCCH, arbitrary L1 signaling, BSR, and a MAC CE. Thereafter, the transmission UE may receive the sidelink grant from the base station and perform HARQ retransmission to the reception UE. The sidelink grant transmitted from the base station to the transmission UE may include one or more of sidelink HARQ process ID, NDI, redundancy version, frequency domain resource information, and time domain resource information. When the transmission UE performs sidelink transmission/retransmission, it may include one or more pieces of information included in the sidelink grant received from the base station in the SCI on the PSCCH and transmit it.

As such, for sidelink retransmission, the total RTT may be calculated by adding the round trip time (RTT) on the PC5 interface between the transmission UE and the reception UE to the round trip time (RTT) on the Uu interface between the UE and the base station. In discontinuous reception, it may be assumed that data reception is not expected during the duration that the HARQ-RTT timer operates.

Accordingly, it is preferable to configure the sidelink DRX HARQ RTT timer to have a larger value than the DRX HARQ RTT timer on the Uu interface. As an example, the sidelink discontinuous reception HARQ RTT timer (e.g., drx-HARQ-RTT-TimerRX-SL, drx-HARQ-RTT-TimerTX-SL, drx-HARQ-RTT-TimerSL) may be allowed to have a larger value (e.g., twice the Uu interface setting value) than the Uu interface discontinuous reception HARQ RTT (e.g., drx-HARQ-RTT-TimerDL, drx-HARQ-RTT-TimerUL).

FIG. 11 is a view illustrating a DRX configuration (DRX-Config) information element according to an embodiment.

Referring to FIG. 11, in the typical NR technology, the drx-HARQ-RTT-Timer could be configured by selecting a value between 0 and 56 symbols. 56 symbols correspond to 4 ms in the case of 15 kHz subcarrier spacing. If the sidelink discontinuous reception HARQ RTT timer has the same range, power consumption of the UE may be unnecessarily increased. Therefore, the sidelink discontinuous reception HARQ RTT timer may be configured to a value larger than the conventional maximum value, 56 symbols (e.g., 112 symbols, which is a double or any natural number larger than 56 symbols, or any natural number larger than 56 symbols and less than 112 symbols).

Each parameter of FIG. 11 is defined as follows.

drx-HARQ-RTT-TimerDL: Value in number of symbols of the BWP where the transport block was received.

drx-HARQ-RTT-TimerUL: Value in number of symbols of the BWP where the transport block was received.

drx-RetransmissionTimerDL: Value in number of slot lengths of the BWP where the transport block was transmitted. sl0 corresponds to 0 slots, sl1 corresponds to 1 slot, sl2 corresponds to 2 slots, and so on.

drx-RetransmissionTimerUL

Value in number of slot lengths of the BWP where the transport block was transmitted. sl0 corresponds to 0 slots, sl1 corresponds to 1 slot, sl2 corresponds to 2 slots, and so on.
Embodiment of Performing Discontinuous Reception (DRX) Considering Whether HARQ is Fed Back Upon providing sidelink communication in an inter-UE unicast scheme, it is preferable to be able to configure an L1/L2 procedure to perform efficient transmission considering various factors, such as inter-UE distance, application type, and QoS requirements. According to an embodiment, HARQ feedback may be deactivated (disabled) per HARQ process or for all HARQ processes belonging to the SL HARQ entity. For example, HARQ feedback from the HARQ reception UE to transmission UE may be disabled per HARQ process. For convenience of description, this is referred to as HARQ feedback disable. This is for convenience of description and may be replaced with other name meaning disabling HARQ, such as HARQ disable, HARQ deactivation, no SL HARQ feedback, HARQ feedback disable in sidelink reception UE.

If HARQ feedback is activated (enabled) (in the corresponding HARQ process), when the reception UE receives SCI from the transmission UE (e.g., if the PSCCH indicates sidelink transmission), the sidelink discontinuous reception HARQ RTT timer (e.g., drx-HARQ-RTT-TimerRX-SL, drx-HARQ-RTT-TimerTX-SL, drx-HARQ-RTT-TimerSL) starts.

If the sidelink discontinuous reception HARQ RTT timer (e.g., drx-HARQ-RTT-TimerRX-SL, drx-HARQ-RTT-TimerTX-SL, drx-HARQ-RTT-TimerSL) expires, the sidelink discontinuous reception retransmission timer (drx-RetransmissionTimerRX-SL, drx-RetransmissionTimerTX-SL, drx-RetransmissionTimerSL) starts.

Otherwise, if HARQ feedback is disabled (in the corresponding HARQ process), when the reception UE receives SCI from the transmission UE (e.g., if the PSCCH indicates sidelink transmission), the sidelink discontinuous reception HARQ RTT timer (e.g., drx-HARQ-RTT-TimerRX-SL, drx-HARQ-RTT-TimerTX-SL, drx-HARQ-RTT-TimerSL) is not applied. Or, if the HARQ feedback is disabled (in the corresponding HARQ process), the sidelink discontinuous reception HARQ RTT timer is also disabled. Or, if the HARQ feedback is disabled, the sidelink discontinuous reception HARQ RTT timer may be set to a specific value (e.g., 0). If the sidelink discontinuous reception HARQ RTT timer is disabled for the corresponding HARQ process, the sidelink discontinuous reception retransmission timer may also be disabled. Or, the sidelink discontinuous reception retransmission timer may be set to a specific value (e.g., 0).

According to another embodiment, although the sidelink discontinuous reception HARQ RTT timer is disabled for the corresponding HARQ process, if the transmission UE is configured to perform retransmission for reliable transmission or if the reception UE is able to expect retransmission accordingly, the sidelink discontinuous reception retransmission timer may start. This embodiment will be described below in detail.

According to still another embodiment, if HARQ feedback is enabled or disabled (in the corresponding HARQ process), when the reception UE receives SCI from the transmission UE (e.g., if the PSCCH indicates sidelink transmission), if repeated transmission is preconfigured/configured, the sidelink discontinuous reception HARQ RTT timer (e.g., drx-HARQ-RTT-TimerRX-SL, drx-HARQ-RTT-TimerTX-SL, drx-HARQ-RTT-TimerSL) starts after the corresponding repeated transmission is terminated.

Whether the above-described HARQ feedback is performed (enabled/disabled) may be configured in the UE through RRC signaling. For example, whether HARQ feedback is performed (enabled/disabled) may be configured in association with a specific logical channel. For example, the sidelink logical channel configuration information may include information for indicating HARQ feedback enable/disable restriction in logical channel priority (LCP) for the sidelink logical channel. The HARQ feedback enable-configured logical channel and the HARQ feedback disable-configured logical channel may not be multiplexed into the same MAC PDU. In the sidelink HARQ process performing transmission/retransmission on the MAC PDU of the sidelink HARQ feedback enable-configured logical channel, the physical layer may be indicated to monitor the PSFCH for the transmission/retransmission. According to another embodiment, whether HARQ feedback is performed (enabled/disabled) may be configured per HARQ process ID. According to still another embodiment, whether HARQ feedback is performed (enabled/disabled) may be configured in association with a specific L1 source ID or L1 destination ID or a specific UE or a specific MAC entity (e.g. MCG MAC, SCG MAC) or a specific group/groupcast session (e.g. L1 source ID, L1 destination ID, L2 source ID, L2 destination ID, any combination thereof (e.g. L1 source ID and L1 destination ID)) and a specific broadcast session (e.g. L1 source ID, L1 destination ID, L2 source ID, L2 destination ID, or any combination thereof (e.g. L1 source ID and L1 destination ID)). Meanwhile, whether HARQ feedback is performed (enabled/disabled) as described above may be indicated to the reception UE through SCI.

For example, the transmission UE may determine whether to perform HARQ feedback based on, e.g., QoS parameter and channel busy ratio (CBR) for the TB (or MAC PDU) to be transmitted and include information for indicating whether HARQ feedback is performed in the SCI and send it.

Meanwhile, even when HARQ feedback is disabled on the sidelink, the transmission UE may perform blind repeated transmission to increase the reliability of transmission. According to an embodiment, the transmission UE may perform multiple transmissions (e.g., MAC schedules packets in a bundle with pdsch-AggregationFactor>1 in down link) of the same transport block (TB) in bundle. The reception UE may soft-combine the multiple transmissions of the same TB in bundle. According to another embodiment, the transmission UE may perform multiple transmissions (e.g., MAC schedules the same TB on the same HARQ process without NDI being toggled) of the same transport block (TB). The reception UE may soft-combine the multiple transmissions of the same TB. If the transmission UE reduces the BLER through (blind) repeated transmission, the transmission UE and reception UE may preconfigure/configure the times when repeated transmission is expected to be aligned and perform PDCCH monitoring, thereby reducing power consumption.

To that end, when HARQ feedback is disabled through an RRC message (or through any L1/L2 signaling), the transmission UE may indicate information for repeated transmission to the reception UE. Or, when HARQ feedback is disabled, the reception UE may efficiently process repeated transmission by monitoring the PSCCH using the sidelink discontinuous reception retransmission timer (drx-RetransmissionTimerTX-SL, RetransmissionTimerRX-SL RetransmissionTimerSL) or sidelink discontinuous reception inactivity timer.

According to an embodiment, the UE may monitor the PSCCH during the time when repeated transmission is expected, using the sidelink discontinuous reception retransmission timer (drx-RetransmissionTimerTX-SL, RetransmissionTimerRX-SL RetransmissionTimerSL). For example, when HARQ feedback is disabled, if the PSCCH indicates sidelink transmission, and the data of the corresponding HARQ process is not successfully decoded, the UE (MAC entity) starts the sidelink discontinuous reception retransmission timer.

According to another embodiment, a new DRX parameter defining maximum duration may be defined until repeated transmission is received, and the UE may monitor the PSCCH during the time when repeated transmission is expected. When a DRX cycle is configured, the UE may be in the active time while the timer is operated according to the newly defined DRX parameter. For example, when HARQ feedback is disabled, if the PSCCH indicates sidelink transmission, and the data of the corresponding HARQ process is not successfully decoded, the UE (MAC entity) starts the timer according to the newly defined DRX parameter.

Meanwhile, if HARQ feedback is disabled, and if it is not the case of blind repeated transmission, the UE may transmit data by always indicating new transmission through PSCCH. In such a case, the UE (the UE's MAC entity) starts or restarts the sidelink discontinuous reception inactivity timer at the first symbol after the PSCCH reception ends. Or, even in the case of repeated transmission, not new transmission, if the PSCCH indicates sidelink transmission, the UE starts or restarts the sidelink discontinuous reception inactivity timer. Or, even in the case of repeated transmission, not new transmission, if the PSCCH indicates sidelink transmission, and the data of the corresponding HARQ process is not successfully decoded, the UE starts or restarts the sidelink discontinuous reception inactivity timer. The base station sets the DR inactivity timer to a non-zero value and indicates, thereby instructing to monitor the PSCCH in accordance with the timer for blind repeated transmission with the UE.

Or, it may not be preferable in light of power consumption to allow the UE to monitor the PSCCH, always expecting repeated transmission. Accordingly, if the base station performs repeated transmission to disable the UE's HARQ feedback and reduce the BLER, the base station may transmit indication information to instruct the UE to perform operations accordingly. According to an embodiment, the indication information may be provided through RRC signaling. According to another embodiment, the indication information may be provided through MAC CE signaling. According to still another embodiment, the indication information may be provided through SCI. The above-described RRC signaling, MAC CE or SCI may further include at least one information of the HARQ process ID and information indicating the activated/deactivated state of repeated transmission.

Further, the reception UE may transmit assistance information to assist the transmission UE in determining the number of times of repeated transmission to the transmission UE or the base station. The corresponding assistance information may include at least one information of HARQ reception failure rate and number of requested repeated transmissions.

The reception UE may prevent unnecessary power consumption by discontinuously monitoring the PSCCH through the above-described operations according to the embodiment.

Hereinafter, hardware and software configurations of the UE and the base station will be briefly described with reference to the accompanying drawings. The UE and the base station may perform the above-described operations all or in any combination thereof.

Figure 12:
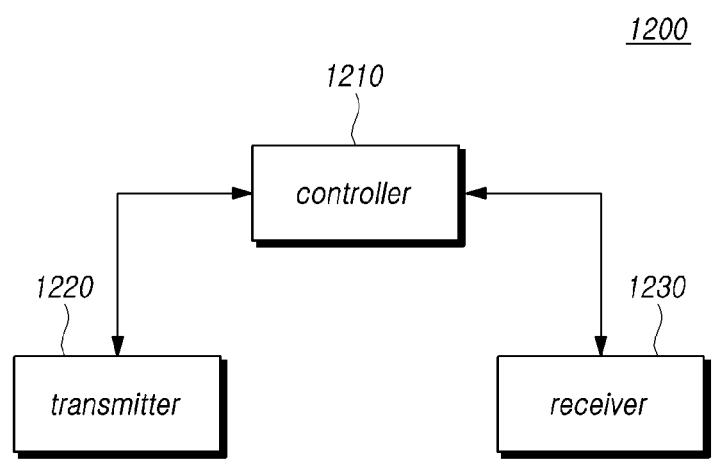
FIG. 12 is a block diagram illustrating a UE according to an embodiment.

FIG. 12 is a block diagram illustrating a UE according to an embodiment.

Referring to FIG. 12, a UE 1200 performing sidelink communication may include a receiver 1230 for receiving sidelink discontinuous reception configuration information and a controller 1210 for configuring the UE with the sidelink discontinuous reception configuration information and discontinuously monitoring a physical sidelink control channel (PSCCH) based on a parameter included in the sidelink discontinuous reception configuration information.

For example, sidelink discontinuous reception configuration information may include information necessary for the UE performing sidelink communication to apply the DRX operation to PSCCH reception. To that end, the sidelink discontinuous reception configuration information may be received in various manners.

According to an embodiment, the sidelink discontinuous reception configuration information may be included in the system information transmitted from the base station. For example, the system information may be included in a sidelink-specific system information block (SIB) or a typical SIB transmitted from the base station. The system information may include sidelink radio bearer (SLRB) information.

According to another embodiment, the sidelink discontinuous reception configuration information may be included in an RRC message transmitted from the transmission UE transmitting the PSCCH or the base station. For example, the base station may transmit discontinuous reception configuration information to each UE through the RRC message. Or, the transmission UE, transmitting sidelink communication data, may transmit the discontinuous reception configuration information to the reception UE.

The controller 1210 may configure the UE 1200 with the DRX parameter included in the sidelink discontinuous reception configuration information. The DRX parameters may be configured separately with respect to at least one of sidelink carrier, sidelink resource pool, UE, MAC entity, UE group, and session. For example, DRX parameters may be configured per sidelink carrier, per sidelink resource pool, per UE, per MAC entity, per UE group, or per session.

According to an embodiment, the DRX parameters may include at least one information of a sidelink discontinuous reception HARQ RTT timer, a sidelink discontinuous reception retransmission timer, a sidelink discontinuous reception on-duration timer, and a sidelink discontinuous reception inactivity timer. Each information included in the DRX parameter may be configured with a different value from that of the DRX parameter configured for the UE to perform communication with the base station.

Further, the controller 1210 discontinuously monitors the PSCCH based on the DRX parameter, determining whether there is sidelink communication data for the UE. The transmission UE transmits a PSCCH in the time period during which the reception UE monitors based on the DRX parameter.

Or, the controller 1210 determines a PSCCH discontinuous monitoring operation based on whether sidelink HARQ is activated. For example, the UE may apply the DRX parameter separately for where the HARQ for sidelink data is activated or where the HARQ is deactivated, determining whether to monitor the PSCCH. Whether the HARQ is activated may be controlled by sidelink control information or by any method.

Further, the controller 1210 controls the overall operation of the UE 1200 according to control of discontinuous reception monitoring operation for the sidelink communication necessary for performing the above-described embodiments. The transmitter 1220 and the receiver 1230 are used to transmit or receive signals or messages or data necessary for performing the above-described disclosure, with the UE and the base station.

Figure 13:
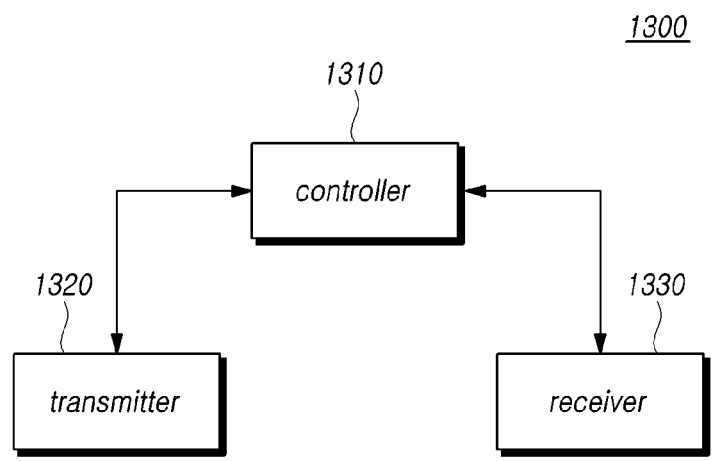
FIG. 13 is a block diagram illustrating a base station according to an embodiment.

FIG. 13 is a block diagram for describing a base station according to an embodiment.

Referring to FIG. 13, a base station 1300 controlling sidelink communication includes a controller 1310 for generating sidelink discontinuous reception configuration information and a transmitter 1320 for transmitting the sidelink discontinuous reception configuration information to a UE. The UE may discontinuously monitor the physical sidelink control channel (PSCCH) based on the discontinuous reception (DRX) parameter included in the sidelink discontinuous reception configuration information.

For example, sidelink discontinuous reception configuration information may include information necessary for the UE performing sidelink communication to apply the DRX operation to PSCCH reception.

For example, the sidelink discontinuous reception configuration information may include DRX parameters. The DRX parameters may be configured separately with respect to at least one of sidelink carrier, sidelink resource pool, UE, MAC entity, UE group, and session. For example, DRX parameters may be configured per sidelink carrier, per sidelink resource pool, per UE, per MAC entity, per UE group, or per session.

According to an embodiment, the DRX parameters may include at least one information of a sidelink discontinuous reception HARQ RTT timer, a sidelink discontinuous reception retransmission timer, a sidelink discontinuous reception on-duration timer, and a sidelink discontinuous reception inactivity timer. Each information included in the DRX parameter may be configured with a different value from that of the DRX parameter configured for the UE to perform communication with the base station.

The sidelink discontinuous reception configuration information may be transmitted in various manners. The UE, receiving the sidelink discontinuous reception configuration information, may be a UE which is in the state of any one of RRC connected, RRC idle, and RRC inactive.

According to an embodiment, the sidelink discontinuous reception configuration information may be included in the system information. For example, the system information may be included in a sidelink-specific system information block (SIB) or a conventional SIB transmitted from the base station. The system information may include sidelink radio bearer (SLRB) information.

According to another embodiment, the sidelink discontinuous reception configuration information may also be included in an RRC message. For example, the transmitter 1320 may transmit discontinuous reception configuration information to each UE through the RRC message.

According to still another embodiment, the transmission UE, transmitting sidelink communication data, may transmit the discontinuous reception configuration information to the reception UE.

Meanwhile, the UE, receiving the sidelink discontinuous reception configuration information, may be configured with the DRX parameters included in the sidelink discontinuous reception configuration information.

The UE discontinuously monitors the PSCCH based on the DRX parameter, determining whether there is sidelink communication data for the corresponding UE. Further, the transmission UE transmits a PSCCH in the time period during which the reception UE monitors based on the DRX parameter.

Or, the UE determines a PSCCH discontinuous monitoring operation based on whether sidelink HARQ is activated.

For example, the UE may apply the DRX parameter separately for where the HARQ for sidelink data is activated or where the HARQ is deactivated, determining whether to monitor the PSCCH. Whether the HARQ is activated may be controlled by sidelink control information or by any method.

Further, the controller 1310 controls the overall operation of the base station 1300 according to control of discontinuous reception monitoring operation for the UE's sidelink communication necessary for performing the above-described embodiments.

The transmitter 1320 and the receiver 1330 are used to transmit or receive signals or messages or data necessary for performing the above-described disclosure, with the UE.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method for performing sidelink communication by a user equipment (UE), the method comprising,
   receiving sidelink discontinuous reception configuration information;
   configuring the UE with the sidelink discontinuous reception configuration information; and
   discontinuously monitoring a physical sidelink control channel (PSCCH) based on a discontinuous reception (DRX) parameter included in the sidelink discontinuous reception configuration information,
   wherein the DRX parameter includes at least one information of a sidelink discontinuous reception hybrid automatic repeat request (HARQ) round trip timer (RTT) timer, a sidelink discontinuous reception retransmission timer, a sidelink discontinuous reception on-duration timer, and a sidelink discontinuous reception inactivity time, and
   wherein the sidelink discontinuous reception HARQ RTT timer is set to a different value depending on whether sidelink HARQ feedback is activated.

2. The method of claim 1, wherein the sidelink discontinuous reception configuration information is included in system information transmitted from a base station.

3. The method of claim 1, wherein the sidelink discontinuous reception configuration information is included in an radio resource control (RRC) message transmitted from a base station or a transmission UE transmitting the PSCCH.

4. The method of claim 1, wherein a plurality of sidelink discontinuous reception configuration information is configured based on L2 destination ID information for each of groupcast and broadcast.

5. The method of claim 1, wherein whether the sidelink HARQ feedback is activated is included and indicated in sidelink control information.

6. The method of claim 1, wherein the sidelink discontinuous reception configuration information is configured per L2 source ID-L2 destination ID pair for unicast.

7. A method for controlling sidelink communication by a base station, the method comprising,
   generating sidelink discontinuous reception configuration information; and
   transmitting the sidelink discontinuous reception configuration information to a UE, wherein the UE discontinuously monitors a physical sidelink control channel (PSCCH) based on a discontinuous reception (DRX) parameter included in the sidelink discontinuous reception configuration information,
   wherein the DRX parameter includes at least one information of a sidelink discontinuous reception hybrid automatic repeat request (HARQ) round trip timer (RTT) timer, a sidelink discontinuous reception retransmission timer, a sidelink discontinuous reception on-duration timer, and a sidelink discontinuous reception inactivity time, and
   wherein the sidelink discontinuous reception HARQ RTT timer is set to a different value depending on whether sidelink HARQ feedback is activated.

8. The method of claim 7, wherein the sidelink discontinuous reception configuration information is included and transmitted in system information or an radio resource control (RRC) message.

9. The method of claim 7, wherein a plurality of sidelink discontinuous reception configuration information is configured based on L2 destination ID information for each of groupcast and broadcast.

10. A user equipment (UE) performing sidelink communication, comprising,
    a receiver receiving sidelink discontinuous reception configuration information; and
    a controller configuring the UE with the sidelink discontinuous reception configuration information and discontinuously monitoring a physical sidelink control channel (PSCCH) based on a discontinuous reception (DRX) parameter included in the sidelink discontinuous reception configuration information,
    wherein the DRX parameter includes at least one information of a sidelink discontinuous reception hybrid automatic repeat request (HARQ) round trip timer (RTT) timer, a sidelink discontinuous reception retransmission timer, a sidelink discontinuous reception on-duration timer, and a sidelink discontinuous reception inactivity time, and
    wherein the sidelink discontinuous reception HARQ RTT timer is set to a different value depending on whether sidelink HARQ feedback is activated.

11. The UE of claim 10, wherein the sidelink discontinuous reception configuration information is included in system information transmitted from a base station.

12. The UE of claim 10, wherein the sidelink discontinuous reception configuration information is included in an radio resource control (RRC) message transmitted from a base station or a transmission UE transmitting the PSCCH.

13. The UE of claim 10, wherein a plurality of sidelink discontinuous reception configuration information is configured based on L2 destination ID information for each of groupcast and broadcast.

14. The UE of claim 10, wherein whether the sidelink HARQ feedback is activated is included and indicated in sidelink control information.

* * * * *